United States Patent
Yoneyama et al.

(10) Patent No.: US 6,231,274 B1
(45) Date of Patent: May 15, 2001

(54) END MILL

(75) Inventors: Masayoshi Yoneyama; Husao Sakai, both of Shizuoka-ken; Michio Mori, Numazu, all of (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/418,567

(22) Filed: Oct. 15, 1999

(30) Foreign Application Priority Data

Oct. 15, 1998 (JP) .................................................. 10-293874

(51) Int. Cl.[7] ....................................................... B23C 5/20
(52) U.S. Cl. .............................. 407/40; 407/48; 407/113; 408/143; 408/226
(58) Field of Search .................................. 407/34, 40, 42, 407/53, 35, 47, 48, 113, 120, 114–116; 408/143, 239 A, 226; 409/232, 234, 141

(56) References Cited

U.S. PATENT DOCUMENTS

| | | | |
|---|---|---|---|
| 2,842,014 | * | 7/1958 | Miller .................................... 408/226 |
| 3,199,382 | * | 8/1965 | Andreasson ........................... 408/226 |
| 3,543,613 | * | 12/1970 | Obloy ..................................... 408/226 |
| 3,678,554 | * | 7/1972 | Ezhov ..................................... 407/115 |
| 3,701,187 | * | 10/1972 | Erkfritz .................................. 407/46 |
| 3,805,349 | * | 4/1974 | Nose ...................................... 407/114 |
| 3,896,532 | * | 7/1975 | Brooks ................................... 407/40 |
| 4,248,553 | * | 2/1981 | Kraemer ................................ 407/114 |
| 4,674,923 | * | 6/1987 | Ogilvie et al. ......................... 407/31 |
| 4,699,549 | * | 10/1987 | Shimomura et al. .................. 407/42 |
| 4,743,144 | * | 5/1988 | Shikata .................................. 407/42 |
| 4,946,318 | * | 8/1990 | David et al. ........................... 407/42 |
| 5,052,863 | * | 10/1991 | Satran ..................................... 407/113 |
| 5,207,538 | * | 5/1993 | Satran ..................................... 407/113 |
| 5,209,611 | * | 5/1993 | Drescher ................................ 407/48 |
| 5,704,736 | * | 1/1998 | Giannetti ................................ 407/35 |
| 5,709,509 | * | 1/1998 | Wegener et al. ...................... 407/114 |
| 5,779,401 | * | 7/1998 | Stallwitz et al. ...................... 407/114 |
| 5,890,853 | * | 4/1999 | Hiranaka ................................ 408/224 |
| 5,893,683 | * | 4/1999 | Johnson ................................. 407/42 |
| 5,947,650 | * | 9/1999 | Satran et al. .......................... 407/113 |
| 5,971,676 | * | 10/1999 | Kojima ................................... 407/42 |
| 5,984,596 | * | 11/1999 | Fehrle et al. .......................... 408/226 |
| 6,053,672 | * | 4/2000 | Satran et al. .......................... 407/40 |

FOREIGN PATENT DOCUMENTS

| | | | |
|---|---|---|---|
| 2819720 | * | 11/1979 | (DE) ..................................... 408/143 |
| 3831397 | * | 3/1989 | (DE) ..................................... 409/234 |
| 358623 A1 | * | 3/1990 | (EP) ...................................... 407/42 |
| 391881 A2 | * | 10/1990 | (EP) ...................................... 408/143 |
| 600757 | * | 6/1984 | (SU) ..................................... 409/234 |
| 1310123 | * | 5/1987 | (SU) ..................................... 409/141 |
| 1808514 | * | 4/1993 | (SU) ..................................... 409/234 |
| WO 97/10915 | * | 3/1997 | (WO) . |

* cited by examiner

Primary Examiner—William Briggs
Assistant Examiner—Erica D. Ergenbright
(74) Attorney, Agent, or Firm—Pillsbury Winthrop LLP

(57) ABSTRACT

An end mill comprises an arbor, a tool body attached to an end of the arbor, and throw-away chips detachably attached to an end face of the tool body. Each throw-away chip has a cutting edge having a peripheral circular cutting edge section for shaping, and an end straight cutting edge section for end milling.

9 Claims, 5 Drawing Sheets

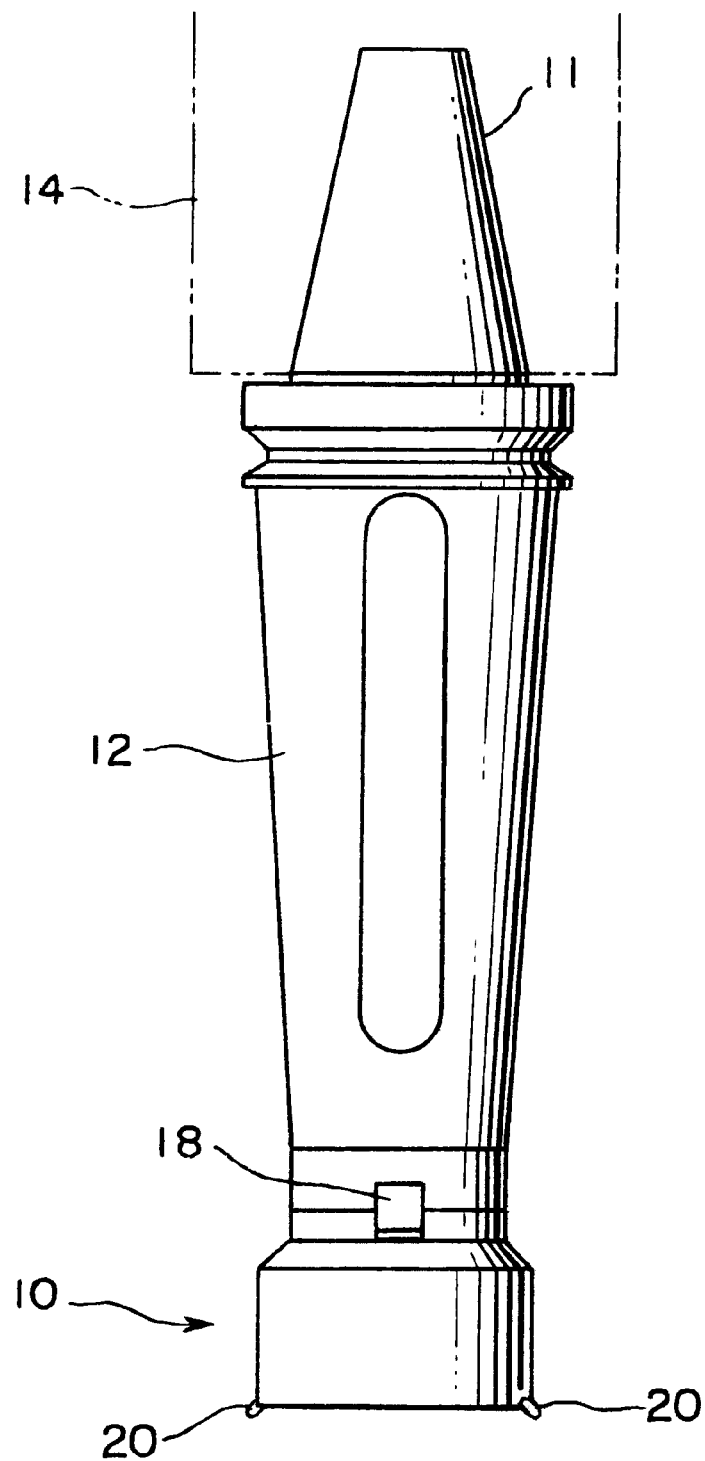
F I G. 1

END MILL

BACKGROUND OF THE INVENTION

1. Field of the Invention

The present invention relates to an end mill and, more particularly, to a throw-away end mill which is capable of carrying out slotting and profiling at once.

2. Description of the Related Art

An end mill which has end cutting edges and side cutting edges or peripheral cutting edges is used widely in a machine tool for slotting, stepping, curved-face milling and profiling. When milling a workpiece to obtain a curved groove or a stepped groove in a surface of the workpiece by the end mill, a groove of a predetermined depth is initially shaped by the end cutting edges of the end mill. Then , the end mill is fed along the groove to shape a curved face by cutting by the side cutting edges. A throw-away end mill which is provided with throw-away tips is conventionally used in the machine tool. The throw-away end mill for the specific purpose of milling curved grooves is provided with end cutting chips for slotting and peripheral cutting chips for curved face milling.

There are some drawbacks to the conventional throw-away end mill as follows. As any large diameter end mills capable of simultaneously carrying out slotting and curved face milling have not been available, when cutting a curved surface of a great width, end mill for the purpose of both slotting and a curved face milling tool, such as a circular cutter, are used in combination. The throw-away end mill capable of simultaneously carrying out both of slotting and curved face milling is subject to a highly intensive cutting force and is liable to chatter.

SUMMARY OF THE INVENTION

Accordingly, it is an object of the present invention to solve those problems in the prior art and to provide an end mill capable of simultaneously carrying out both of slotting and curved face milling and of machining a workpiece smoothly without chattering or without breaking its cutting chips.

According to one aspect of the present invention, an end mill comprises a tool body, and throw-away chips attached to an end part of the tool body. Each of the throw-away chips has a cutting edge having a peripheral cutting circular edge section for shaping, and an end straight cutting edge section for end cutting smoothly merging into the peripheral circular edge section.

The end mill of the present invention is capable of carrying out both slotting and curbed-face milling because each of the throw-away chips on its end is provided with the cutting edge having both the peripheral circular cutting edge section and the straight cutting edge section.

Preferably, each of the throw-away chips is retained in place by two retaining faces perpendicular to a bearing face formed in a chip holding part at an end of the tool body to seat the throw-away chip thereon to prevent the chip from becoming loose or from being damaged.

According to the present invention, an arbor holding the tool body may be provided in its lateral surface with longitudinal carbide ribs to enhance the rigidity thereof. The highly rigid arbor suppresses the chattering of the chips of the end mill during machining.

Preferably, a plurality of longitudinal grooves are formed at equal angular intervals in the lateral surface of the arbor and the carbide ribs are fixedly embedded in the longitudinal grooves so that the arbor may have isotropic rigidity.

BRIEF DESCRIPTION OF THE DRAWINGS

The above and other objects, features and advantages of the present invention will become more apparent from the following description taken in connection with the accompanying drawings, in which:

FIG. 1 is a side elevation of an end mill in a first embodiment according to the present invention attached to an arbor;

DESCRIPTION OF THE PREFERRED EMBODIMENTS

Figure 2:
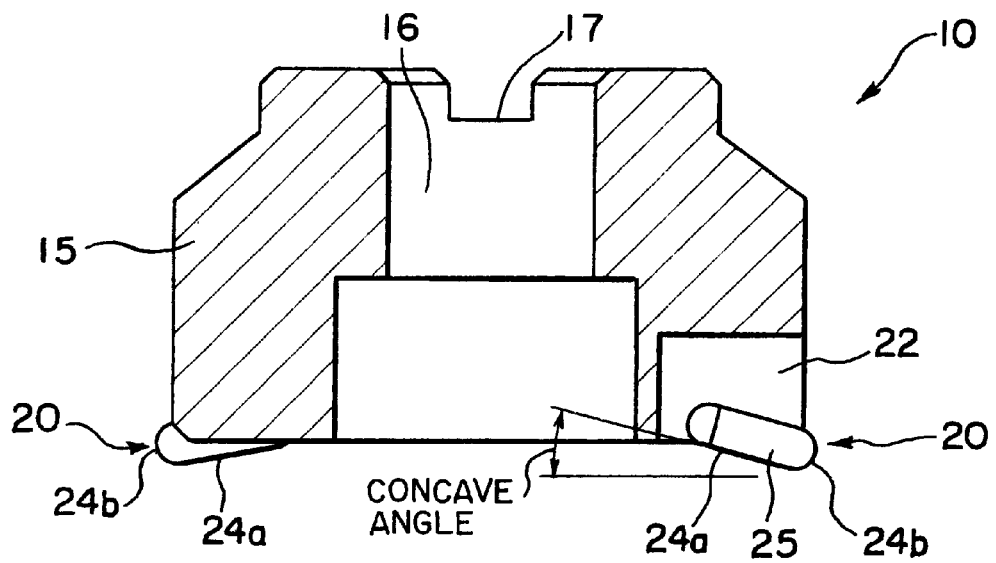
FIG. 2 is a sectional view of the end mill shown in FIG. 1.

Referring to FIG. 1, reference numeral 10 denotes an throw-away end mill 10 in a first embodiment according to the present invention. The end mill 10 is attached to an front end part of an arbor 12 which extends from a neck in a shank 11. The end mill 10 is fitted up to a spindle 14 included in a machine tool by the arbor 12. FIG. 2 shows the end mill 10 in a sectional view. The end mill 10 has a tool body 15 provided with a mounting bore 16 in its central part to receive the front end part of the arbor 12. A key way 17 for attaching the end mill 10 to the arbor 12 is cut in an upper end part of the tool body 15. A key 18 located at the front end of the arbor 12 is fitted in the keyway 17 as shown in FIG. 1.

Figure 3:
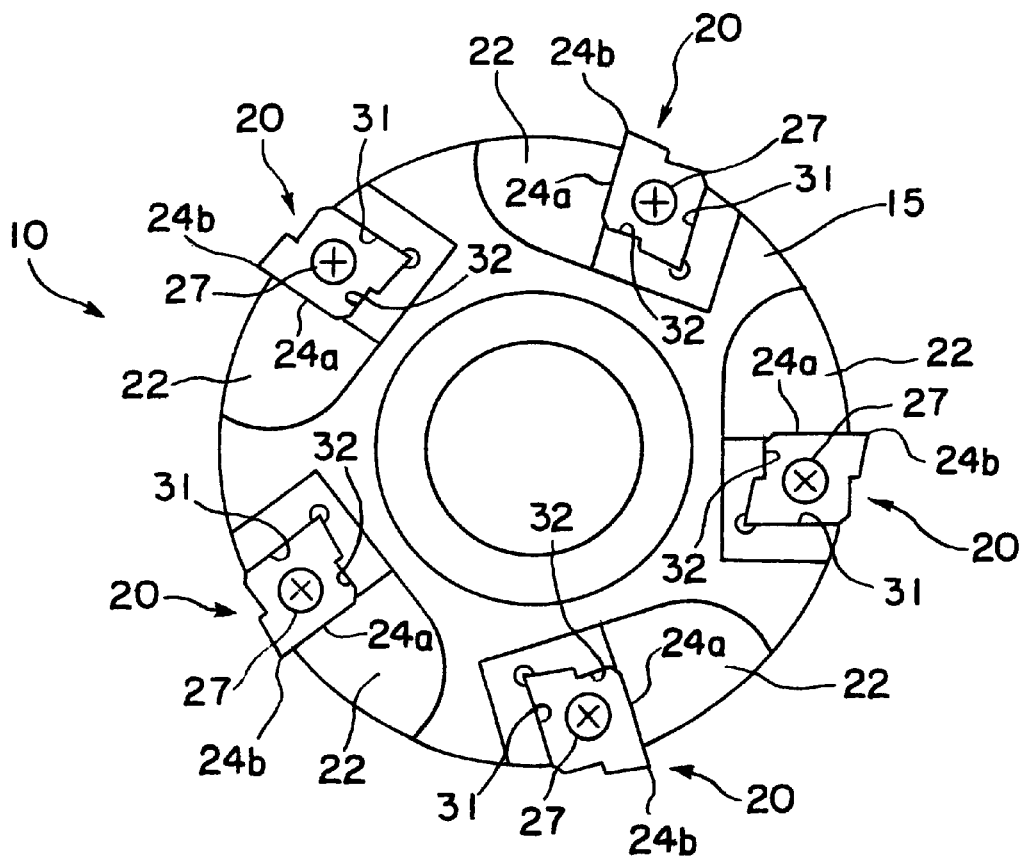
FIG. 3 is an end view of the end mill shown in FIG. 1.

FIG. 3 shows the end mill 10 in a front end view. A plurality of throw-away chips 20 each having a cutting edge are detachably attached to the end face of the tool body 15 of the end mill 10. According to this embodiment, the five throw-away chips 20 are arranged at equal angular intervals symmetrically with respect to the axis of the tool body 15. Chip pockets 22 adjacent to the throw-away chips 20 are recessed in the end face of the tool body 15.

Figure 4A:
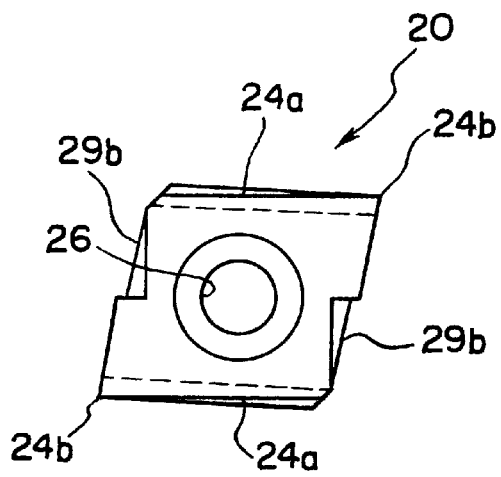
FIGS. 4(a), 4(b) and 4(c) are side elevations of one of chips attached to the end mill as viewed from three different directions, respectively.
Figure 4B:
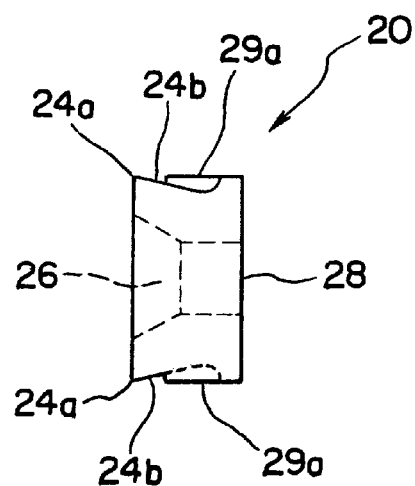
Figure 4C:
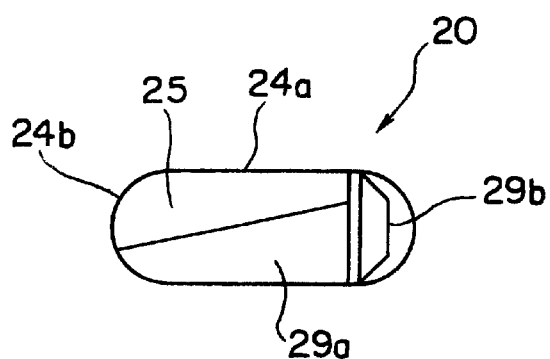

FIGS. 4(a), 4(b) and 4(c) shows the throw-away chip 20 in a plan view, a side elevation and a front elevation, respectively. The throw-away chip 20 has cutting edges on opposite side surfaces, respectively. As shown in FIG. 4(c), each cutting edge consists of a straight cutting edge section 24a and a circular cutting edge section 24b continuous with the straight cutting edge section 24a. Thus, the side surface is inclined at a predetermined rake angle to form a rectangular rake face 25. The straight cutting edge section 24a is formed in the long side of the rake face 25. The circular cutting edge section 24b is formed by rounding a corner of the rake face 25.

As shown in FIG. 4(a), the throw-away chip 20 is provided with a central hole 26. A flat head screw 27 is inserted into the central hole 26 of the throw-away chip 20 in a threaded hole formed in the tool body 15 to fasten the throw-away chip 20 detachably to the end part of the tool body 15 as shown in FIG. 5.

Figure 5:
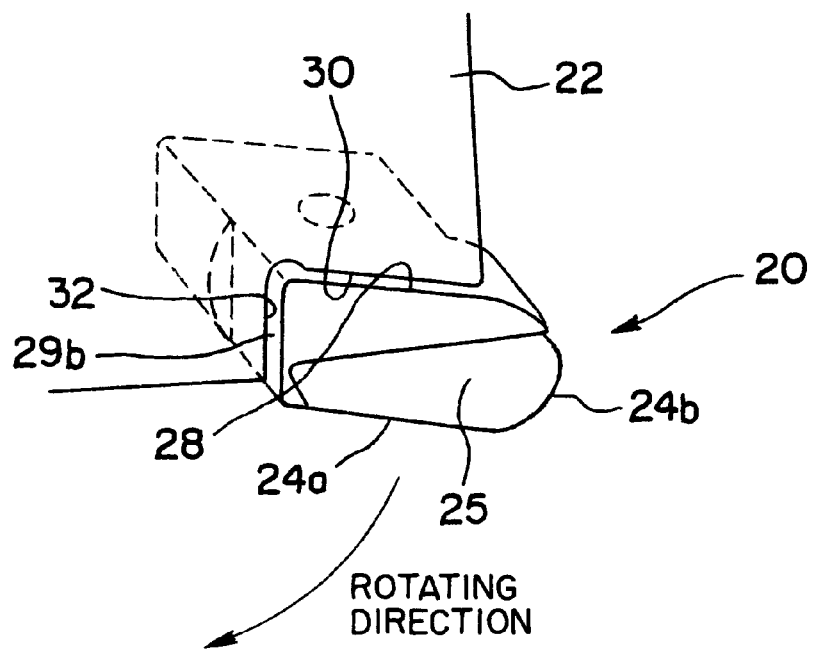
FIG. 5 is a perspective view of a chip holding part of a tool body included in the end mill shown in FIG. 1.

As shown in FIGS. 3 and 5, five recesses are formed at equal angular intervals in the end surface of the tool body 15. The throw-away chips 20 are placed in the recesses and screwed into the tool body 15 with the flat head screws 27.

Referring to FIG. 4, the throw-away chip 20 has a bottom surface 28 in a lower surface. The throw-away chip 20 has two sets of constrained surfaces, i.e., a first constrained surface 29a inclined at an acute angle to the bottom surface 28, and a second constrained surface 29b perpendicular to the first constrained surface 29a. Since the throw-away chip 20 is provided with two sets of cutting edges in a symmetrical arrangement, constrained surfaces 29a and 29b are formed in a symmetrical arrangement. When the throw-away chip 20 is attached to the tool body 15, either of the constrained surfaces 29a and 29b performs as a constrained surface.

Figure 6:
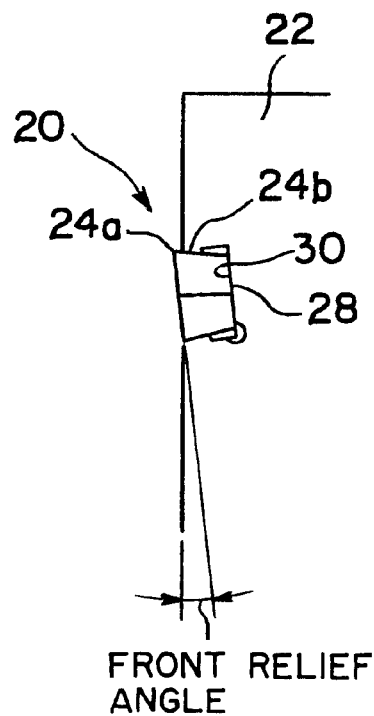
FIG. 6 is a fragmentary side view of an end part of the tool body of the end mill shown in FIG. 1.

As shown in FIGS. 3 and 5, each recess is defined by a bearing face 30, a first constraining face 31 and a second constraining face 32. The bearing face 30 is substantially perpendicular to the axis of the end mill 10. As shown in FIG. 3, the throw-away chip 20 is retained firmly in place on the end face of the tool body 15 by the first constraining face 31 contiguous with the first constrained surface 29a, and the second constraining face 32 contiguous with the second constrained surface 29b. A concave angle (FIG. 2) and a front relief angle (FIG. 6) are determined properly so that the straight cutting edge section 24a and the circular cutting edge section 24b of the cutting edge of the throw-away chip 20 may not be chipped.

The milling performance of the end mill 10 will be described hereinafter. The end mill 10 is rotated in the direction of the arrow shown in FIG. 5. The straight edge section 24a of the cutting edge of each throw-away chip 20 serves as an end cutting edge which performs slotting against a surface of a workpiece. The circular cutting edge section 24b of the cutting edge of the throw-away chip 20 serves as a peripheral cutting edge for milling a curved side face of a slot or groove. The throw-away chips 20 attached to the end face of the tool body 15 of the end mill 10 have both the functions of an end cutting edge and a peripheral cutting edge. Therefore, the end mill 10 is capable of simultaneously carrying out slotting and curved-face milling at once.

A intensive cutting force concentrates on the circular cutting edge section 24b during the above shaping process. Since the throw-away chip 20 has the straight cutting edge section 24a formed by shaping one of long sides of the rectangular rake face 25, and the circular cutting edge section 24b formed by rounding a corner of the rectangular rake face 25, the radius of curvature of the nose of the circular cutting edge section 24b is necessarily small and hence a cutting force acting on the circular cutting edge section 24b is considerably reduced. Since the throw-away chip 20 has the highly rigid, rectangular rake face 25 forming the cutting edge, the throw-away chip 20 will not chatter, will not be chipped and is capable of properly functioning when the end mill 10 is fed at a high feed rate.

Since the throw-away chip 20 is retained firmly by the two constraining faces, i.e., the first constraining face 31 facing the rotating direction of the throw-away chip 20 and the second constraining face 32 facing a radial direction, the throw-away chip 20 will not become loose even if a cutting force acts on the throw-away chip 20, and the throw-away chip 20 is able to cut the workpiece smoothly.

As the throw-away chip 20 has the pair of cutting edges, the flat head screw 27 is unfastened, the throw-away chip 20 is turned through an angle of 180° when the cutting performance of one of the pair of cutting edges deteriorates to use the other cutting edge.

Figure 7:
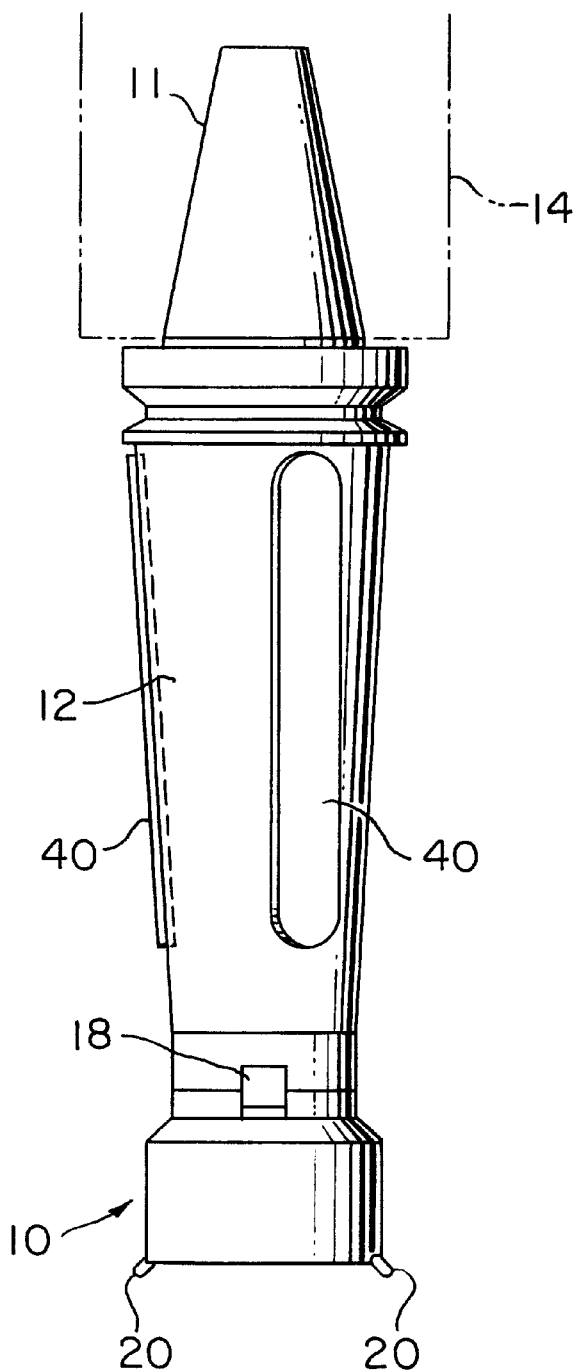
FIG. 7 is a side elevation of an end mill in a second embodiment according to the present invention attached to an arbor.

FIG. 7 shows an end mill 10 in a second embodiment according to the present invention. The second embodiment has an arbor 12 provided with three carbide ribs 40 of a rectangular cross section as reinforcement for rigidity, which extends in the longitudinal direction on the lateral surface of the arbor 12. The end mill 10 in the second embodiment is the same in other respects as the end mill 10 in the first embodiment.

Figure 8:
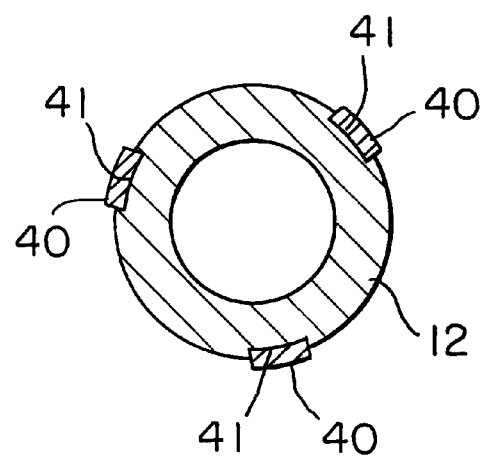
FIG. 8 is a cross-sectional view of the arbor shown in FIG. 7.

As shown in FIG. 8, longitudinal grooves 41 of a rectangular section are formed in the lateral surface of the arbor 12 at equal angular intervals, and the carbide ribs 40 of a length equal to that of the grooves 41 are fitted in the grooves 41 and are brazed to the arbor 12. The carbide ribs 40 protrude slightly from the lateral surface of the arbor 12. The carbide ribs 40 enhance the rigidity of the arbor 11 and suppress the bending and chattering of the arbor 12 effectively during cutting to ensure smooth cutting.

Since the carbide ribs 40 are arranged at equal angular intervals, the rigidity of the arbor 12 is enhanced equally with respect to all directions. The ribs 40 need not be bars of a rectangular cross section and may be ribs of any suitable shape, such as strips, round bars or triangular bars.

As is apparent from the foregoing description, according to the present invention, both end cutting and shaping can simultaneously be carried out by the end mill, and smooth cutting can be achieved without entailing the chattering of the edges of the chips and without damaging the edges of the chips.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An end mill for slot milling comprising:

an arbor having a cylindrical body with a front end part and a rear end part, a tapered shank attached to the rear end part thereof;

a tool body having a front end face, said tool body being attached to the front end part of the arbor; and a plurality of throw-away tips detachably attached by fasteners in the front end face of the tool body;

wherein each of the throw-away tips has a cutting part having a partly circular cutting edge section serving as a peripheral cutting edge, wherein all of the partly circular cutting edge section extending beyond a peripheral face of the tool body is curved, and a straight cutting edge section serving as an end cutting edge, the circular cutting edge section continuous with the straight cutting edge section.

2. The end mill according to claim 1, wherein the plurality of throw-away tips are arranged on the front end face of the tool body at equal angular intervals in a symmetrical arrangement.

3. The end mill according to claim 1, wherein each of the plurality of throw-away tips is a rectangular tip having a tooth face having a long side section defining the end straight cutting edge section of the cutting part, and a rounded portion defining the peripheral circular cutting edge section of the cutting part.

4. The end mill according to claim 3, wherein each of the throw-away tips has a pair of symmetrical cutting edges each having the end straight cutting edge section and the peripheral circular cutting edge section.

5. The end mill according to claim 1, wherein tip bearing faces on which the throw-away tips are seated, first constraining faces each extending perpendicularly to the corresponding bearing face, and second constraining faces each extending perpendicularly to the corresponding bearing face are formed in an end surface of the tool body.

6. The end mill according to claim 5, wherein each of the throw-away tips have two sets of a first constrained surface to be set in contact with the first constraining face and a second constrained surface to be set in contact with the second constraining face, and the two sets of the first and the second constrained surface are formed in a symmetrical arrangement.

7. The end mill according to claim 1, wherein the arbor is fixedly provided in a peripheral surface thereof with a plurality of ribs extending parallel to an axis thereof.

8. The end mill according to claim 7, wherein a plurality of grooves extending in the longitudinal direction are formed at equal angular intervals in the peripheral surface of the arbor, and the ribs are fixedly fitted in the grooves, respectively.

9. The end mill according to claim 8, wherein the ribs are made of a cemented carbide.

\* \* \* \* \*